R. Norris, Jr.

Hardening and Washing Artificial Stone.

N⁰ 89,884. Patented May 11, 1869.

Witnesses: Jno. D. Patten, Edmund Mason

Inventor: Richard Norris, Jr. By Atty A. B. Stoughton

UNITED STATES PATENT OFFICE.

RICHARD NORRIS, JR., OF BALTIMORE, MARYLAND.

IMPROVEMENT IN HARDENING AND WASHING RANSOME CONCRETE STONE.

Specification forming part of Letters Patent No. 89,884, dated May 11, 1869.

*To all whom it may concern:*

Be it known that I, RICHARD NORRIS, Jr., of the city and county of Baltimore and State of Maryland, have invented a new and useful Improvement in Hardening and Washing Artificial Stone, usually termed "Ransome's Concrete Stone;" and I do hereby declare the following to be a full, clear, and exact description of the same, reference being had to the accompanying drawings, making a part of this specification, in which—

Figure 1:
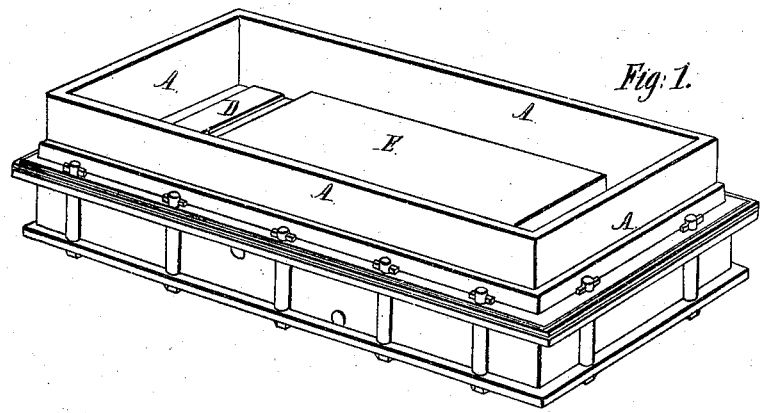
Figure 2:
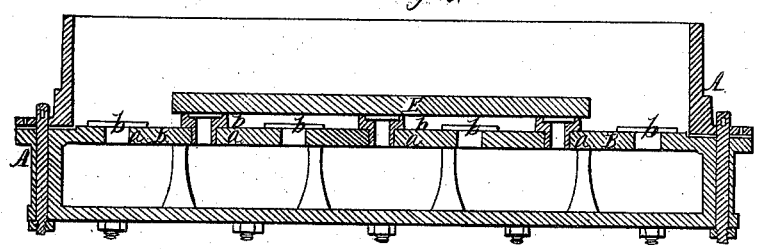
Figure 3:
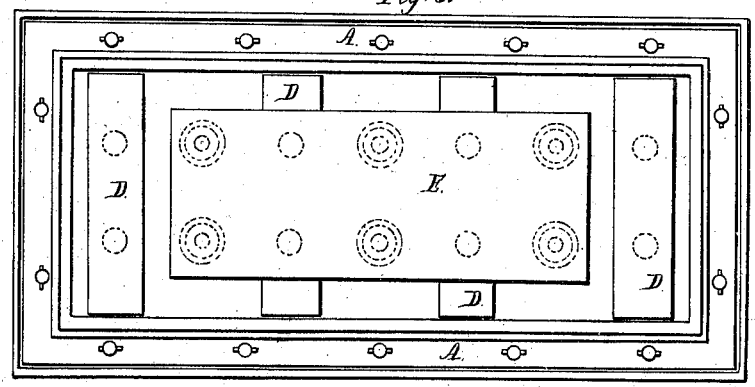
Figure 5:
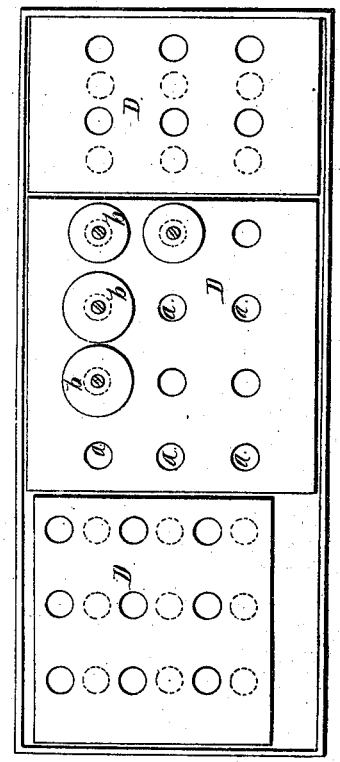
Figure 4:
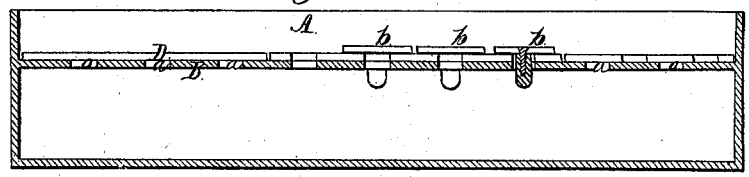

Figure 1 represents in perspective an apparatus used successfully for the above-named purpose. Fig. 2 represents a longitudinal vertical section through the same. Fig. 3 represents a top plan of the apparatus. Figs. 4 and 5 represent, respectively, a section and a top plan of a modified form of apparatus for the purpose herein named.

Similar letters of reference, where they occur in the separate figures, denote like parts in all of the drawings.

In the process of manufacture of the "Ransome concrete stone," so known, and as universally practiced prior to my discovery, the stone to be hardened by the chloride of calcium combining chemically with the silicate of soda, so as to form an insoluble silicate of lime, was immersed in the chloride of calcium, or had the latter poured over it. Neither of these processes would harden the stone "through and through;" because the moment the chloride of calcium was so applied and came into chemical contact with the silicate, the surface became hardened at once, and prevented the chloride, when of the requisite strength or specific gravity, from penetrating into and through the composition, so as to harden it in the interior.

The chloride of sodium formed in the stone by the action of the silicate and of the chloride of calcium, if allowed to remain in the stone, also materially damaged its strength and durability; and while it might, by immersion, or the pouring of water over the stone, remove the chloride of sodium from the surface, yet the water will not by these applications of it entirely wash out this destructive substance.

The object of my invention is to remedy these two hitherto quite fatal objections in the manufacture of a hard, strong, and durable stone, according to the Ransome process; and my invention consists in an apparatus having a controllable diaphragm, of which the stone to be treated forms a part, for forcing by artificial means the chloride of calcium of the requisite strength into and through the stone, to harden it, by combining with the silicate of soda; and also by the same or equivalent forced means to drive water into and through the stone to wash out the chloride of sodium formed therein by the mixture or contact of the chloride and the silicate of soda.

To enable others to make, use, and apply my invention, I will proceed to describe the same in connection with the drawings, as follows:

A is a vat or vessel, which may be made of iron, and which has a perforated partition, B, extending horizontally through it, said partition being furnished with a series of holes, $a\ a\ a$, &c., and as this partition is to sustain the artificial stones to be treated, some of which are quite heavy, it is supported underneath by columns or supports C.

The holes or openings $a$, such as are not required to be used, or all of the holes or openings not immediately under or covered by the stones to be treated, are covered or plugged by any impermeable elastic material, such as prepared india-rubber, or other equivalent material. Or, instead of plugs for each individual hole or opening, a sheet, strip, or piece of punched or cut rubber-cloth or fabric, as at D, Fig. 5, may be used, which, when laid in one position, may expose a series of holes, and, if shifted a short distance, will cover them all. And by means of plugs $b$, as seen in the figures, any of the series of holes may be plugged, while others of the series are open, the object being to have two chambers or compartments, with a controllable diaphragm between them, that can, in whole or in part, be made water and comparatively air tight as occasion may require.

The partially-formed stone or stones, that is, the mixed and molded sand and silicate, as at E, are laid upon the flexible plugs $b$, or india-rubber strip D, and all the remaining holes not covered by the stone or stones are plugged or closed. Those under the stone and with which the stone is in contact being open, the chloride of calcium is then poured into the upper chamber, so as to cover the incipient stone, and the air may be at the same time exhausted from the lower chamber, and the only avenues the chloride of calcium can find to the lower chamber thus exhausted are through the stone itself, to reach the openings underneath it, all the others being sealed or packed tight by the rubber or other equivalent packing. Thus, by artificial or forced means, the chloride of calcium, of the proper or required strength or specific gravity, is forced through the stone, and everywhere through it comes in contact with the silicate of soda, and converts it into an insoluble silicate of lime, which hardens it through and through.

The chemical action of the silicate of soda and of the chloride of calcium forms a chloride of sodium, which, unless removed, damages the stone, which now being quite hard and solid resists the easy penetration of water. To force water through the stone to wash out this chloride of sodium, which is readily dissolved with water, I may use the same apparatus, simply drawing off the chloride-of-calcium solution, or what is left of it, so as not to waste it, and filling the upper chamber with water, which by exhausting the air in the lower chamber will be forced through the stone, and thus dissolve and take out the chloride of sodium. The stone before it undergoes the washing process is treated by boiling in calcium, as is the manner now practiced. Or I may use a duplicate apparatus for the washing, the process in each for driving through the liquid being substantially, if not identically, the same.

I am aware that chemicals have been forced into and through various substances by vacuum and by hydrostatic pressure. Of course I lay no claim to any such process in general, my invention relating to a special material, object, and purpose, and to a special means of packing the material to be impregnated or impermeated by the fluid matter, and which from its nature resists such penetration; but Having fully described my invention, what I do claim as new, and desire to secure by Letters Patent, is—

An apparatus having two compartments, an open and a closed one, and with a packed and controllable diaphragm between them, of which the stone to be treated forms a part for forcing by artificial means into or through what is known as the "Ransome concrete stone," either, or both, chloride of calcium of the proper strength to harden, or water to dissolve and wash out the chloride of sodium formed therein, substantially in the manner herein described and represented.

R. NORRIS, Jr.

Witnesses:
W. H. CARPENTER,
W. G. HALYBURTON.